US009520257B2

(12) United States Patent
Mills et al.

(10) Patent No.: US 9,520,257 B2
(45) Date of Patent: *Dec. 13, 2016

(54) INTEGRAL MODULE WITH LIGHTED FACEPLATE DISPLAY

(75) Inventors: Patrick Wellington Mills, Bradenton, FL (US); James Michael McCormick, Bradenton, FL (US)

(73) Assignee: LABINAL, LLC, Denton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/125,153

(22) PCT Filed: Jun. 26, 2012

(86) PCT No.: PCT/US2012/044207
§ 371 (c)(1),
(2), (4) Date: Dec. 10, 2013

(87) PCT Pub. No.: WO2013/003354
PCT Pub. Date: Jan. 3, 2013

(65) Prior Publication Data
US 2014/0111345 A1   Apr. 24, 2014

Related U.S. Application Data (60) Provisional application No. 61/501,513, filed on Jun. 27, 2011, provisional application No. 61/503,047, filed on Jun. 30, 2011.

(51) Int. Cl.
*H01H 71/04* (2006.01)
*H02B 1/044* (2006.01)
(Continued)

(52) U.S. Cl.
CPC .............. *H01H 71/04* (2013.01); *F21V 33/00* (2013.01); *H02B 1/044* (2013.01); *H01H 9/182* (2013.01); *H02B 1/056* (2013.01)

(58) Field of Classification Search
CPC .................. H01H 71/04; H01H 13/023; H01H 2219/0622; B60K 37/00
(Continued)

(56) References Cited

U.S. PATENT DOCUMENTS 4,459,448 A * 7/1984 McDill ......................... 200/311
4,685,029 A   8/1987 Tillman
(Continued)

FOREIGN PATENT DOCUMENTS

EP   2254207   11/2010

OTHER PUBLICATIONS

United States Patent and Trademark Office, "International Search Report and Written Opinion," Sep. 14, 2012, 10 pp.
European Search Report mailed Apr. 28, 2015.

*Primary Examiner* — Steven Lim
*Assistant Examiner* — Hongmin Fan
(74) *Attorney, Agent, or Firm* — Rankin, Hill & Clark LLP (57) ABSTRACT

A faceplate assembly is provided. The faceplate assembly includes a faceplate having planar member with a first side and a second side, the planar member having a number of openings therethrough, the planar member first side having a number of opaque portions and a number of translucent portions, each planar member first side translucent portion disposed adjacent one planar member opening, a number of sources of localized illumination, each the source of localized illumination disposed adjacent the planar member second side and adjacent a planar member first side translucent portion, and wherein the source of localized illumination may be illuminated causing a selected planar member first side translucent portion to be illuminated.

14 Claims, 6 Drawing Sheets

(51) Int. Cl.
 *F21V 33/00* (2006.01)
 *H01H 9/18* (2006.01)
 *H02B 1/056* (2006.01)

(58) Field of Classification Search
 USPC ............... 340/638; 362/23.04; 200/310–314
 See application file for complete search history.

(56) References Cited

U.S. PATENT DOCUMENTS

| | | | |
|---|---|---|---|
| 4,725,919 A * | 2/1988 | Dijaux et al. ................. | 361/627 |
| 5,747,756 A * | 5/1998 | Boedecker ........... | H01H 13/702 |
| | | | 200/310 |
| 6,176,591 B1 * | 1/2001 | Lewis et al. .................... | 362/85 |
| 7,355,135 B2 | 4/2008 | Rainer et al. | |
| 7,554,454 B2 | 6/2009 | Johnson et al. | |
| 7,616,096 B1 | 11/2009 | Sorensen | |
| 2003/0043120 A1 * | 3/2003 | Han ............................. | 345/168 |
| 2006/0254893 A1 * | 11/2006 | Mills et al. ................... | 200/313 |
| 2008/0068844 A1 * | 3/2008 | Ozawa ......................... | 362/311 |
| 2008/0129112 A1 | 6/2008 | Mills | |
| 2010/0296229 A1 | 11/2010 | Meux et al. | |

* cited by examiner

INTEGRAL MODULE WITH LIGHTED FACEPLATE DISPLAY

CROSS REFERENCE TO RELATED APPLICATION

This application claims priority from PCT/US2012/044207, filed on Jun. 26, 2012, entitled INTEGRAL MODULE WITH LIGHTED FACEPLATE DISPLAY, and to U.S. Provisional Patent Application Ser. No. 61/501,451, filed Jun. 27, 2011 entitled, GROUNDED CIRCUIT BREAKER PANEL ELECTRICAL MODULE WITH LIGHTED FACEPLATE and U.S. Provisional Patent Application Ser. No. 61/503,047, filed Jun. 30, 2011, entitled, CIRCUIT BREAKER PANEL ELECTRICAL MODULE WITH EMBEDDED SYSTEMS.

BACKGROUND

Field

The disclosed concept pertains generally to a faceplate assembly and, more particularly, to a faceplate assembly, such as, for example, a lighted faceplate display wherein selected portions of the faceplate may be selectively illuminated. The disclosed concept further pertains to circuit breaker modules having such a lighted faceplate assembly.

Background Information

Circuit breakers are used, for example, in aircraft electrical systems where they not only provide over-current protection but also serve as switches for turning equipment on and off. Aircraft or subminiature circuit breakers, for instance, are typically relatively small to accommodate the relatively high-density layout of aircraft circuit breaker panels, which make circuit breakers for numerous circuits accessible to a user. Aircraft electrical systems can consist, for example, of hundreds of circuit breakers, each of which is used for a circuit protection function as well as a circuit disconnection function through a push-pull handle.

The circuit breaker push-pull handle is moved from in-to-out in order to open the corresponding load circuit. This action may be either manual or, else, automatic in the event of an overload or fault condition. If the push-pull handle is moved from out-to-in, then the load circuit is re-energized. If the load circuit had been automatically de-energized, then the out-to-in operation of the push-pull handle corresponds to a circuit breaker reset action.

It is known to mount a number of conventional aircraft or aerospace circuit breakers in a module. The module includes a frame assembly defining an enclosed space in which the circuit breakers are disposed. The module includes a faceplate having indicia (text, numbers, symbols, and lines grouping selected circuit breakers) thereon indicating the purpose or function of each circuit breaker. To ensure the indicia is visible, especially at night or other dark conditions, the module is typically backlit. That is, the faceplate is a translucent planar member having two coatings on one side. The first coating disposed on the planar member is a light color, typically white, and the second coating, which is disposed on the first coating, is a dark color, typically black or grey. The indicia are created by etching the indicia in the second coating. That is, a portion of the second coating is removed so that the first coating is visible. Further, a light is disposed in the module frame assembly enclosed space. The light illuminates the inner side of the planar member. Where the second coating is intact, the light does not pass through the planar member, the indicia however, is illuminated. Thus, there are dark portions of the faceplate, i.e. where the second coating is intact, and illuminated portions of the faceplate, i.e. the indicia. It is noted that the indicia are typically formed from thin lines and do not allow a substantial amount of light to pass therethrough. That is, the indicia are illuminated and easily visible, but the light is not sufficient to illuminate other portions of the outer face of the faceplate or adjacent objects. An incandescent light bulb in the module frame assembly enclosed space illuminates all indicia and, as such, cannot be used to illuminate a specific indicia, such as a warning indicia. This is a problem.

The planar member also includes a number of openings through which each circuit breaker push-pull handle passes so that handles are on the user side of the module. Thus, the push-pull handle may be the only visible portion of the aerospace circuit breakers during normal usage. Accordingly, the push-pull handle may also be used to indicate the status of the aerospace circuit breaker. For example, the push-pull handle may include a brightly colored, stem that is only visible when the push-pull handle is in the out position. Thus, if the push-pull handle is typically in the in position during use, a tripped circuit breaker in the out position would be noticeable as the brightly colored stem would be visible.

Typically, the indicia associated with each circuit breaker is spaced above or below, or otherwise adjacent to, each exposed handle. Thus, the planer member immediately adjacent the opening through which a handle passes is typically covered by the second coating. That is, the faceplate is mostly dark, other than the indicia.

There is room for improvement in such circuit breaker modules. For example, at night, or during other dark conditions, the push-pull handle brightly colored stem may not be visible as the module may be in the dark. Further, light from the indicia is insufficient to illuminate the push-pull handle. Thus, a circuit breaker may trip, causing the brightly colored portion of the stem to be exposed, but the pilot may not see the brightly colored portion of the stem due to poor lighting. Further, aircraft electronics may be able to determine other conditions associated with a circuit breaker other than a tripped status, i.e. a need for a test or diagnostic. The module described above does not provide a device for communicating such needs.

Thus, there is a need for a circuit breaker module, and more specifically a faceplate assembly for a circuit breaker module, that provides a clearly visible indication of a circuit breaker's condition.

SUMMARY

These needs and others are met by embodiments of the disclosed concept which provides for a faceplate assembly and, more particularly, to a faceplate assembly, such as, for example, a lighted faceplate display wherein selected portions of the faceplate may be selectively illuminated. The disclosed concept further pertains to circuit breaker modules having such a lighted faceplate assembly.

In accordance with one aspect of the disclosed concept, a faceplate assembly includes a faceplate having planar member with a first side and a second side, the planar member having a number of openings therethrough, the planar member first side having a number of opaque portions and a number of translucent portions, each planar member first side translucent portion disposed adjacent one planar member opening, a number of sources of localized illumination, each the source of localized illumination disposed adjacent the planar member second side and adjacent a planar member first side translucent portion, and wherein the source of localized illumination may be illuminated causing a selected planar member first side translucent portion to be illuminated.

As another aspect of the disclosed concept, a circuit breaker panel electrical module includes a frame assembly, a number of circuit breakers, and a faceplate assembly, the frame assembly having a front member and a back member, the frame assembly front member and the frame assembly back member being spaced from each other and defining an enclosed space, each the circuit breaker having a body with an outwardly extending movable handle, the faceplate assembly including a faceplate and a number of sources for localized illumination, the faceplate including a planar member with a first side and a second side, the planar member having a number of openings therethrough, the planar member first side having a number of opaque portions and a number of translucent portions, each planar member first side translucent portion disposed adjacent a planar member opening, each the source of localized illumination disposed adjacent the planar member second side and adjacent a planar member first side translucent portion, the faceplate assembly coupled to the frame assembly front member, each the circuit breaker body disposed in the circuit breaker panel electrical module frame assembly enclosed space with each circuit breaker outwardly extending movable handle extending through a faceplate planar member opening, and wherein each the source of localized illumination may be illuminated causing one the planar member first side translucent portion to be illuminated.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one i.e., a plurality).

As employed herein, the term "processor" shall mean a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

As used herein, and when used in reference to communicating data or a signal, "in electronic communication" include both hardline and wireless forms of communication.

As used herein, "correspond" indicates that two structural components are sized to engage each other with a minimum amount of friction. Thus, an opening which corresponds to a member is sized slightly larger than the member so that the member may pass through the opening with a minimum amount of friction. This definition is modified if the two components are said to fit "snugly" together. In that situation, the difference between the size of the components is even smaller whereby the amount of friction increases. If the element defining the opening and/or the component inserted into the opening are made from a deformable or compressible material, the opening may even be slightly smaller than the component being inserted into the opening.

As used herein, a "coupling" or a "coupling component" is one element of a coupling assembly. That is, a coupling assembly includes at least two elements, or components, that are structured to be coupled together. It is understood that the elements of a coupling assembly correspond to each other or are otherwise structured to be joined together. For example, in a coupling assembly, if one coupling element is a bolt, the other coupling element is a nut. Further, it is understood that the two elements of a coupling assembly may not be described at the same time.

The disclosed concept is described in association with a circuit breaker panel for aircraft circuit breakers, although the disclosed concept is applicable to a wide range of circuit breaker panels.

Figure 1:
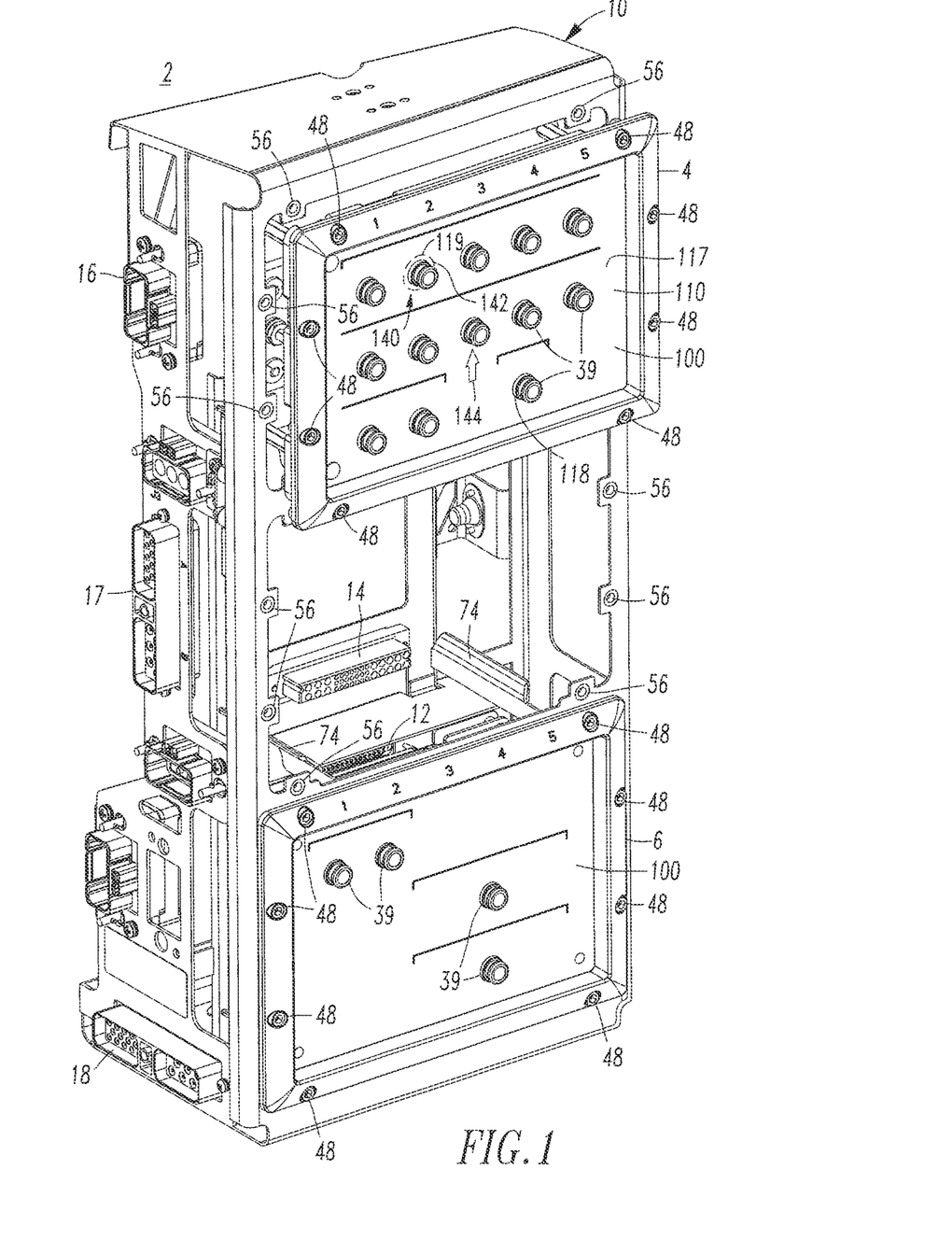
FIG. 1 is a front vertical isometric view of a circuit breaker panel with one circuit breaker module removed.
Figure 2:
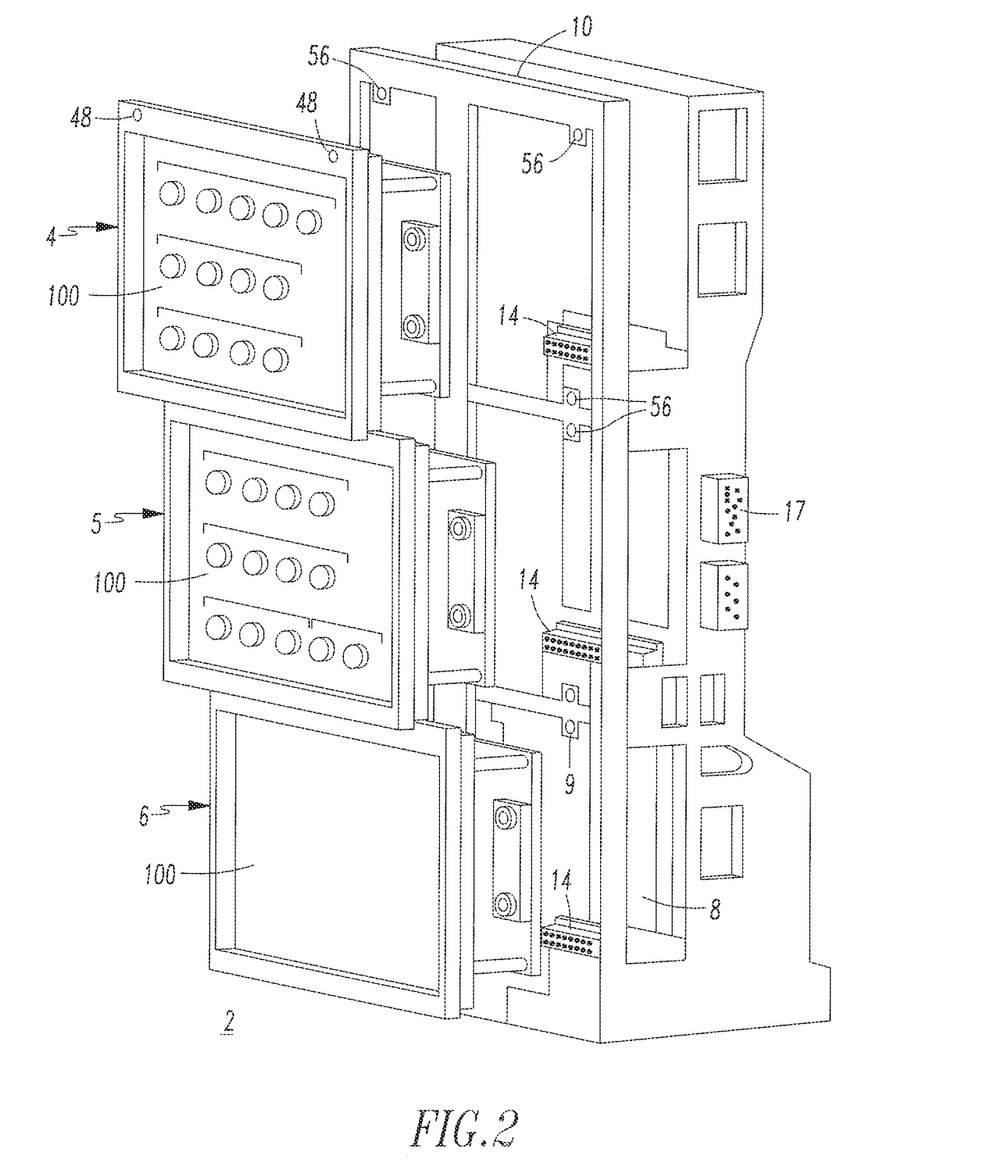
FIG. 2 is another view of the circuit breaker panel of FIG. 1.

Referring to FIGS. 1 and 2, a circuit breaker panel 2 includes a number of circuit breaker modules 4, 5, and 6 (e.g., without limitation, two exemplary DC circuit breaker modules 4 and 5 and an exemplary AC circuit breaker module 6, are shown) each having a connector 7 (FIG. 3), a monitoring module 8 having a connector 9, and a frame 10 including a first connector 12 coupled to the frame 10 for the monitoring module 8 and structured to removably electrically and mechanically engage the monitoring module connector 9. The circuit breaker panel 2 further includes a number of second connectors 14 coupled to the frame 10 for the number of circuit breaker modules 4, 5, 6. Each of the number of second connectors 14 is structured to removably electrically and mechanically engage the connector 7 of a corresponding one of the number of circuit breaker modules 4, 5, 6. A number of third connectors 16, 17, 18 are coupled to the frame 10. As is known, the circuit breaker panel 2 also includes a plurality of conductors (not shown) which electrically connected the various connectors 12, 14. The conductors are further electrically connected between one of a number of third connectors 16, 17, 18 (e.g., for connection to an AC load or DC load). Additional details of the circuit breaker panel 2 are shown and described in U.S. patent application Ser. No. 13/086,442, filed on Apr. 14, 2011, which is assigned to Eaton Corporation and incorporated herein by reference.

Figure 6:
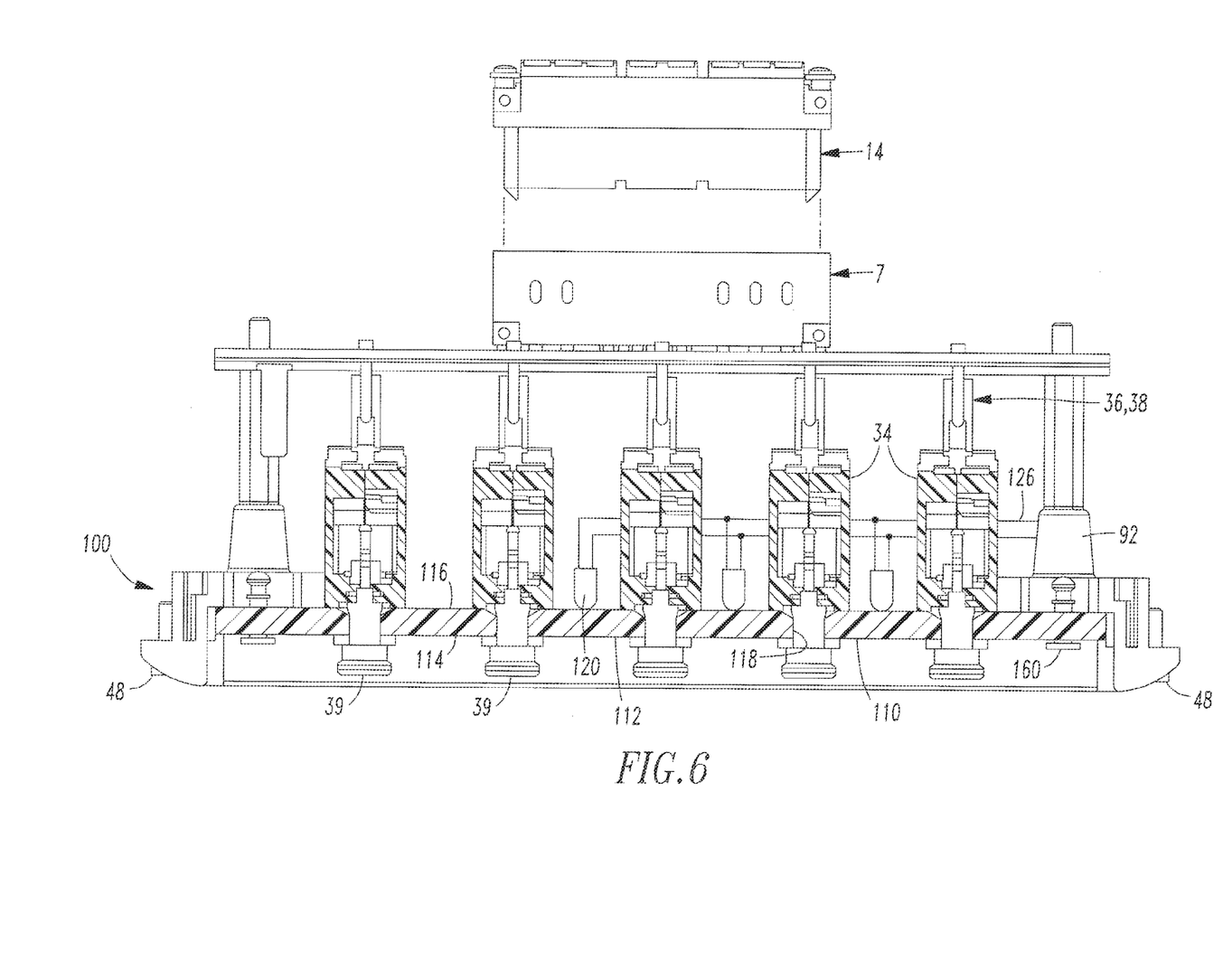
FIG. 6 is a cross-sectional view of the circuit breaker module of FIG. 3 showing a faceplate configuration according to an embodiment of the present invention.

Each of the number of circuit breaker modules 4, 5, 6 also includes a number of fasteners 48 (FIG. 6). The frame 10 also includes a number of apertures 56 (FIG. 1), each aperture 56 cooperating with one of the number of fasteners 48 of a corresponding one of the number of circuit breaker modules 4, 5, 6 to removably couple the corresponding one of the number of circuit breaker modules 4, 5, 6 to the frame 10. Further, the circuit breaker modules 4, 5, 6 may include an electrical module 70 (shown schematically) configured to communicate with and control a faceplate 110, described below. Such an electrical module 70 may be disposed on the circuit breaker modules 4,5,6, or, electrical module 70 may be disposed at another location and be in electrical communication with a faceplate assembly 100. Thus, the circuit breaker modules 4,5,6 include an electrical connector receptacle structured to be coupled to, and in electronic communication with both the electrical module 70 and a plug-in electrical connector 154 on the faceplate assembly 100.

Figure 4:
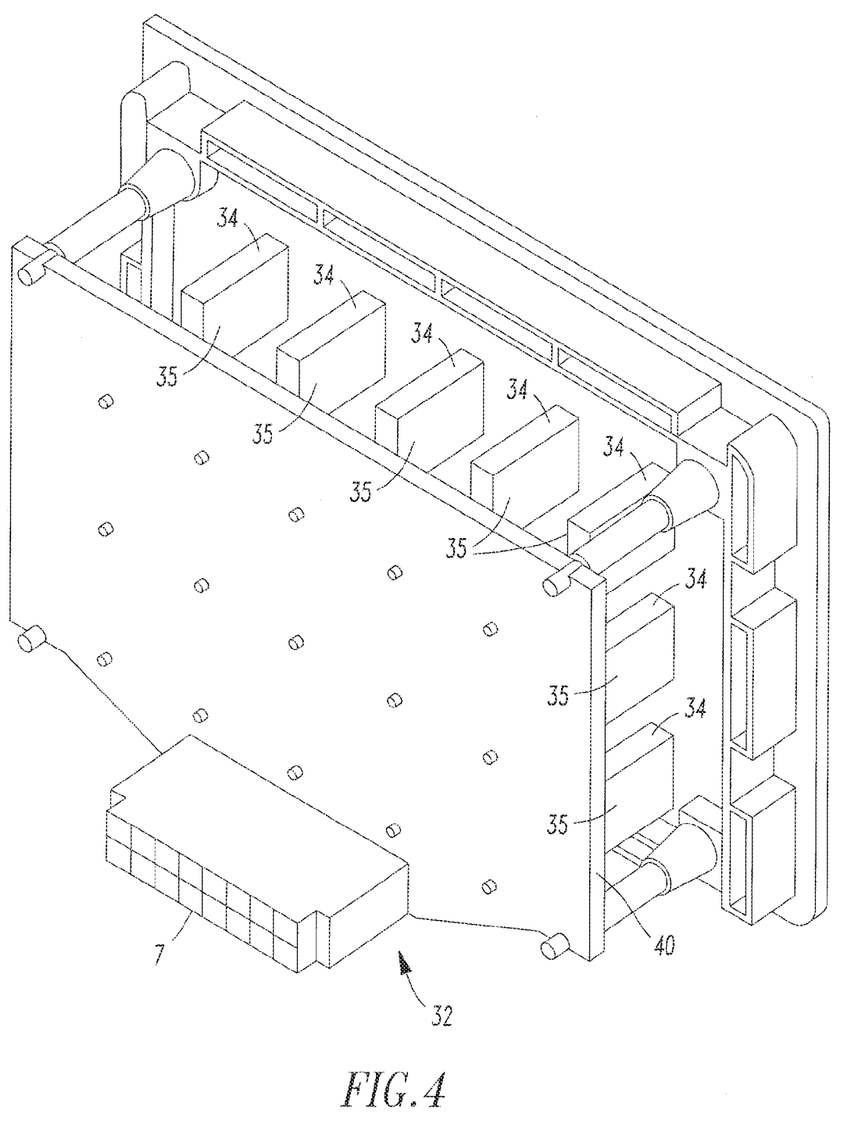
FIGS. 4 and 5 are oblique views of the circuit breaker module of FIG. 3.
Figure 5:
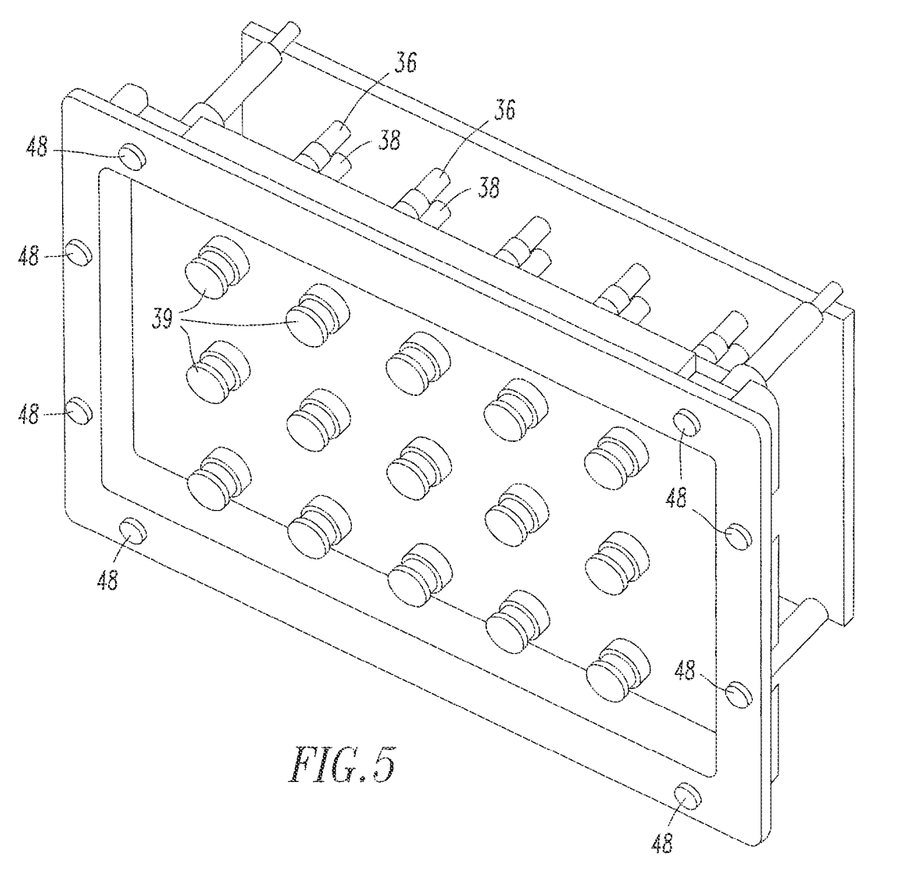

As shown in FIGS. 4 and 5, each of the number of circuit breaker modules 4,5,6 includes a number of connectors 7 or 32, a plurality of circuit breakers 34 each including a body 35 with at least one line terminal 36 and at least one load terminal 38, and a circuit structure supporting the circuit breakers 34 and electrically interconnecting the at least one line terminal 36 and the at least one load terminal 38 of each of the circuit breakers 34 with the number of connectors 7 or 32. Each said circuit breaker 34 having a body 35 with an outwardly extending movable handle 39. As is known, the handle 39 may be actuated, typically by an in/out motion, to open and close, or following a trip incident, reset the circuit breaker 34.

Figure 3:
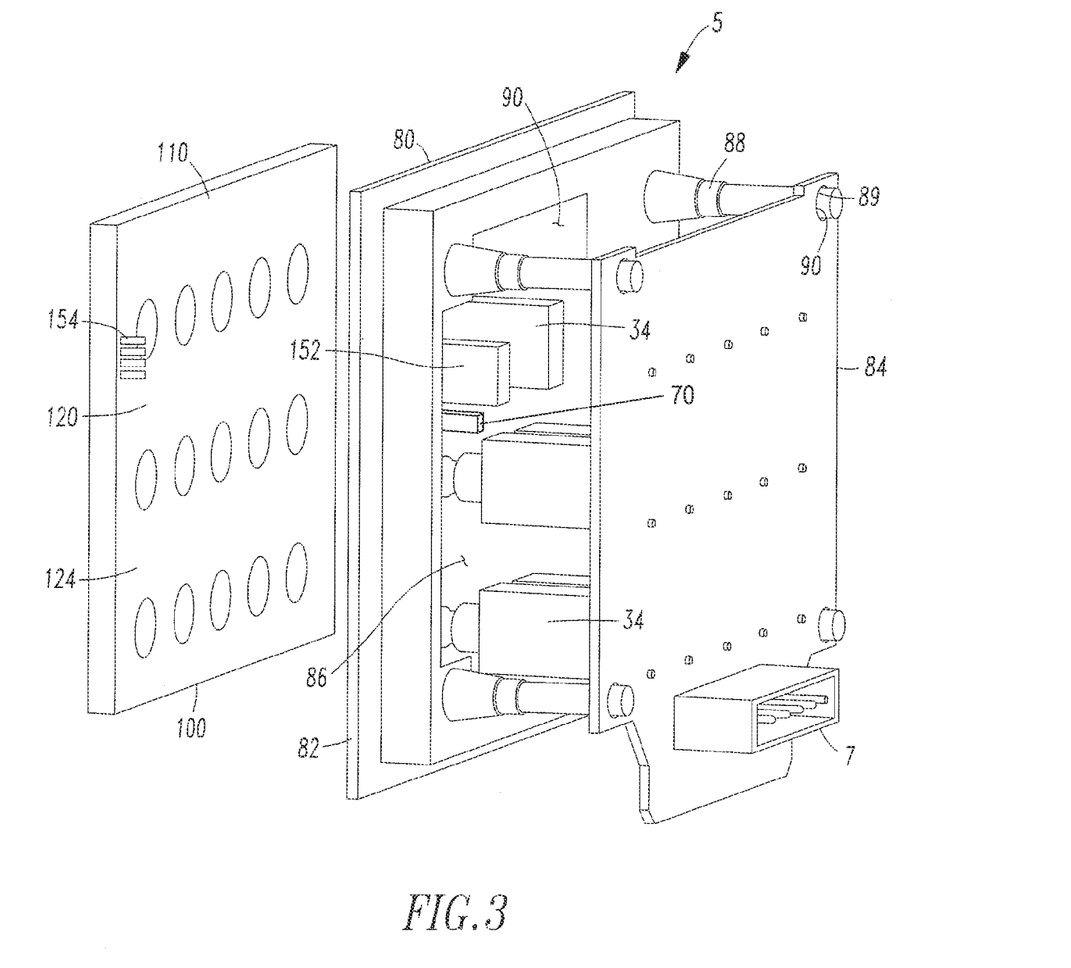
FIG. 3 is an exploded view of a circuit breaker module according to an embodiment of the present invention, showing a lighted (illuminated) faceplate (panel).

As shown in FIG. 3, each circuit breaker module 4, 5, 6 also includes a frame assembly 80, a number of circuit breakers 34 (as noted above), and a faceplate assembly 100. The frame assembly 80 has a generally planar front member 82 and a generally planar back member 84. The back member may be a circuit board having electrical conductors (not shown) with which the circuit breaker line and load terminals 36, 38 are in electrical communication. The frame assembly front member 82 and the frame assembly back member 84 are spaced from each other and define an enclosed space 86. That is, the frame assembly members 82, 84 may include, for example, posts 88 extending from one of either the front member 82 or the back member 84. The posts 88 may have a coupling 89 on their distal ends structured to be coupled to the other of either the front member 82 or the back member 84. Further, the front member 82 includes an opening 90 sized to correspond to the faceplate 110. The frame assembly 80 further includes face plate couplings 92 that are structured to be coupled to the faceplate fasteners 160 and to hold the faceplate 110 in compression. That is, as used herein, the faceplate 110 "in compression" means that the faceplate 110 is biased toward the enclosed space 86 and compresses objects having a greater height than the height between the faceplate 110 and the hack member 84.

As shown in FIG. 6, the faceplate assembly 100 includes a faceplate 110 and a number of sources for localized illumination 120. The faceplate 110 includes a planar member 112 with an outer, first side 114 and an inner, second side 116. The planar member 112 has a number of openings 118 therethrough. The openings 118 are sized to correspond to the size of the circuit breaker handles 39 and to allow the circuit breaker handles 39 to pass through the planar member 112. In an exemplary embodiment, the openings 118 are not snug, but do not allow light to pass therethrough. The planar member 112 is made from a clear or translucent material and is structured to allow light to pass therethrough. One side, or both sides, of the planar member 112 is coated with layers (not shown) of a light, opaque material, such as, but not limited to, a white material. A substantially dark and opaque material, such as, but not limited to, a black or grey material is then applied over top of the light opaque material. The outer layer of substantially dark and opaque material may be etched away so as to allow light to diffuse through the planar member 112 and the light, opaque material. The areas that are coated with the substantially dark and opaque material are, as used herein, "opaque portions" 117 (FIG. 1). The areas wherein the substantially dark and opaque material has been removed are, as used herein, "translucent portions" 119 (FIG. 1). It is understood that light cannot pass through the opaque portions 117 and can pass, or diffuse, through the translucent portions 119. As discussed below, it is assumed that the coatings are disposed on the planar member outer, first side 114, but it is understood that other configurations may be used.

As used herein, a "source of localized illumination" 120 is a light source that effectively illuminates a limited area and includes at least a light emitting diode (LED) 122 (FIG. 6) and an electroluminescent backlight 124. A source of localized illumination 120 does not illuminate a general area and may be used to illuminate a warning indicia 140, discussed below, thereby solving the problem associated with other lights such as an incandescent light bulb. An LED 122 produces a light that, essentially, is projected in a cone. That is, the light does not illuminate the general area in a manner similar to an incandescent bulb. Further, the LED 122 is typically small, having a size of about 2.0 mm×1.2 mm×75 mm. The LED 122 may be a single LED 122 capable of producing different colors. Further, LEDs 122 may be arranged on a strand 126, i.e. a chain of LEDs 122 wherein selected LEDs 122 on the strand may be illuminated while others are not. Further, the LEDs 122 on the strand 126 may include LEDs 122 of different colors, or, clusters of LEDs 122 wherein different LEDs 122 in the cluster are different colors. As used herein, a "cluster" means LEDs in very close proximity such that all LEDs 122 in the cluster illuminate a single translucent portion 119, as described below. A cluster of LEDs 122 acts as a single source of localized illumination 120 so that all LEDs 122 in the cluster illuminate a single "associated" planar member first side translucent portion 119. Thus, a single first side translucent portion 119, such as a first side translucent portion 119 shaped as an arrow, as described below, may be illuminated by a red LED 122 in the cluster or a green LED 122 in the cluster.

It is further noted that, for a large first side translucent portion 119, such as, but not limited to a circular halo 142 (described below), a group of LEDs 122 may be structured to act as a single source of localized illumination 120. In this configuration, the group of LEDs 122 is "associated" with the large first side translucent portion 119. That is, the multiple LEDs 122 illuminate the large first side translucent portion 119, but do not illuminate any other first side translucent portion 119.

An electroluminescent backlight 124 (FIG. 3) is a thin planar member having an electroluminescent surface or body. The electroluminescent backlight 124 is applied, to the planar member 112. The electroluminescent backlight 124 is capable of having selected portions illuminated. Thus, the portions of the electroluminescent backlight 124 are source of localized illumination 120. These portions may be as small as about 0.010 in.×0.010 in. Further, the electroluminescent backlight 124 is capable of producing different color light. Thus, one portion of the electroluminescent backlight 124 may be illuminated in green, while another portion is illuminated in red, and other portions may be dark.

Further, a source of localized illumination 120 has changeable characteristics. These changeable characteristics are selected from the group including color (as noted above), strobe (flashing) or intensity. As used herein, "intensity" means the brightness of the source of localized illumination 120. That is, the source of localized illumination 120 may be bright, dim, in between, or changing from one state to another, e.g. fading or brightening. The characteristics, including a combination of characteristics, may be selected for each source of localized illumination 120. For example, and without limitation, one source of localized illumination 120 may be red and flashing, while another is green, bright and steady.

The planar member translucent portions 119 are disposed on the planar member first side 114. Each planar member first side translucent portion 119 is disposed adjacent a planar member opening 118. Each source of localized illumination 120 is disposed adjacent the planar member second side 116. Further, each source of localized illumination 120 is disposed adjacent an associated planar member first side translucent portion 119. As used herein, and when the coating creating the opaque and translucent portions 117, 119 is on the outer, first side 114, an "adjacent" source of localized illumination 120 is disposed on the opposite side of the planar member 112 from the planar member first side translucent portion 119. It is understood that if the coatings are on the planar member inner, second side 116, the "adjacent" source of localized illumination 120 is disposed immediately adjacent the translucent portion 119. Further, each planar member first side translucent portion 119 has a single "associated" source of localized illumination 120 capable of illuminating only the "associated" planar member first side translucent portion 119. That is, the light from an "associated" source of localized illumination 120 only causes the "associated" planar member first side translucent portion 119 to be illuminated and other planar member first side translucent portions 119 are not illuminated thereby. Thus, a single source of localized illumination 120 may be illuminated causing a selected planar member first side translucent portion 119 to be illuminated; i.e. the planar member first side translucent portion 119 "associated" with that single source of localized illumination 120. It is understood that other sources of localized illumination 120 each have a different "associated" planar member first side translucent portion 119.

Each first side translucent portion 119 is an indicia, and more preferably a warning indicia 140. A warning indicia 140 is structured to clearly be associated with a single planar member opening 118 and thus be associated with a single circuit breaker 34. For example, a warning indicia 140 may be a halo 142 (circle, double circle, broken circle, etc.) disposed about the planar member opening 118 through which a circuit breaker handle 39 extends. Thus, the halo 142 is disposed about the circuit breaker handle 39. When the source of localized illumination 120 associated with that specific first side translucent portion 119 is illuminated, the halo 142 is illuminated. Thus, the specific circuit breaker 34 associated with the halo 142 can easily be identified. Another warning indicia 140 is a highlight 144. A highlight 144 is a planar member first side translucent portion 119 having a specific shape, such as, but not limited to a circle, square, star, rectangle, arrow (shown), or triangle. The highlight 144 is disposed adjacent to a single planar member opening 118. That is, the highlight 144 will always be closer to a single planar member opening 118 than any other. As used herein, a "warning indicia" 140 is an indicia structured to attract a user's attention; simple alphanumeric text is not a warning indicia 140. More than one warning indicia 140 may be associated with a single circuit breaker 34. For example, a single circuit breaker 34 may have an associated halo 142 and a highlight 144. Thus, different information regarding the circuit breaker 34 may be conveyed at one time.

Further, the source of localized illumination 120 for each first side translucent portion 119 is structured to change characteristics in response to the condition of the associated circuit breaker 34. For example, a circuit breaker 34 may trip due to an arc fault or a ground limit. In response to one condition, e.g. an arc fault, the source of localized illumination 120 may produce a solid red light in a halo 142, whereas for a ground fault, the source of localized illumination 120 may flash a yellow light in a highlight 144. Thus, the combination of a selected illumination characteristic and a selected first side translucent portions 119 provides a "fault identification." As used herein, a "fault identification" is a combination of the characteristics of a source of localized illumination 120, e.g. color, flashing etc., and the nature, e.g. shape, location, etc., of the warning indicia 140. In this example, two different shaped translucent portions 119 were identified. It is understood that a single shaped translucent portion 119 may be used for different fault identifications. For example, if a circuit breaker 34 has a single associated first side translucent portion 119, say a halo 142, the halo 142 could flash yellow, i.e. the source of localized illumination 120 may flash a yellow light, when a ground fault is detected and be a steady red, i.e. the source of localized illumination 120 may provide a red light, when an arc fault is detected. As another example, a halo 142 may be a broken (dashed) circle having multiple arc segments. Each arc segment is an individual first side translucent portion 119 having an associated source of localized illumination 120. The arc segments may be sequentially illuminated thereby creating the appearance of movement about the halo 142. This may be one "fault identification" for the circuit breaker 34 associated with the halo 142. Alternatively, the sources of localized illumination 120 for the segments may act in concert, e.g. all producing a constant light or a flashing light, thus illuminating the entire halo 142. This may be a different "fault identification" for the circuit breaker 34 associated with the halo 142.

The circuit breakers 34 may have at least the following conditions: arc fault, ground fault, degrading CVD thermal, ACFI, GF, and diagnostic. The circuit breakers 34 may have additional sensors, not shown, structured to rely relevant information such as, but not limited to, temperature. Preferably, each fault identification is associated with one circuit breaker condition. That is, in an exemplary embodiment, a steady red light always means an arc fault, regardless of the specific circuit breaker 34. It is noted that the fault identification may be the only indication for the circuit breaker 34. That is, the circuit breaker may not include a mechanical indicia, such as, but not limited to, a colored handle or stem.

It is further noted that each circuit breaker module 4, 5 (FIG. 2), 6 includes an electrical module 70 (FIG. 3, as noted above) configured to communicate with the faceplate 110 and an electrical connector receptacle 152 that is in electrical communication with the electrical module 70. The faceplate 110 includes a plug-in electrical connector 154 configured to correspond to the electrical connector receptacle 152. That is, the plug-in electrical connector 154 is shaped to fit in the electrical connector receptacle 152 and includes conductors positioned to communicate with conductors in the electrical connector receptacle 152.

The faceplate 110 is structured to be coupled to the frame assembly front member 82 by faceplate fasteners 160. Further, the faceplate planar member 112 is structured to be a compressive member. As noted above, the frame assembly face plate couplings 92 are structured to be coupled to the faceplate fasteners 160 and to hold the faceplate 110 in compression. Thus, when the faceplate 110 is coupled to the frame assembly 100, the circuit breakers 34 in the frame assembly enclosed space 86 will be compressed and the circuit breaker terminals 36, 38 will be biased toward the frame assembly back member 84.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given.

What is claimed is:

1. A faceplate assembly for a circuit breaker panel electrical module, said circuit breaker panel electrical module having frame assembly and a number of circuit breakers, said circuit breaker panel electrical module frame assembly having a front member and a back member, said circuit breaker panel electrical module frame assembly front member and said circuit breaker panel electrical module frame assembly back member being spaced from each other and defining an enclosed space, said circuit breakers each having a body with an outwardly extending movable handle, each said circuit breaker body disposed in said circuit breaker panel electrical module frame assembly enclosed space, said faceplate assembly comprising:
   a faceplate including a planar member with a first side and a second side, wherein the planar member is a compressive member and said planar member first side has a number of opaque portions and a number of translucent portions, said planar member defining a number of openings that are sized to receive the respective movable handles of the circuit breakers so as to prevent a passage of light through the openings while permitting the light to pass through the translucent portions of the planar member first side, each planar member first side translucent portion disposed adjacent one planar member opening;
   a number of sources of localized illumination;
   each said source of localized illumination disposed adjacent said planar member second side and adjacent a planar member first side translucent portion and wherein said source of localized illumination may be illuminated causing a selected planar member first side translucent portion to be illuminated, wherein said source of localized illumination is an electroluminescent backlight that is a panel member applied to the planar member; and
   a number of fasteners and a number of faceplate assembly couplings, the faceplate assembly couplings being sized and positioned to correspond to the faceplate assembly fasteners;
   wherein the faceplate planar member is spaced from the circuit breaker panel electrical module frame assembly back member such that when said faceplate assembly fasteners are connected to said frame assembly faceplate assembly couplings, said faceplate planar member compresses said circuit breakers in said frame assembly so as to bias the circuit breakers toward the circuit breaker panel electrical module frame assembly back member.

2. The faceplate assembly of claim 1 wherein said source of localized illumination has changeable characteristics, said changeable characteristics selected from a group including color, strobe, and intensity.

3. The faceplate assembly of claim 2 wherein:
   selected said planar member first side translucent portions are associated with an adjacent planar member opening; and
   said planar member first side translucent portions include shaped translucent portions selected from the group including a halo and a highlight.

4. The faceplate assembly of claim 3 wherein:
   said source of localized illumination structured to change characteristics in response to a condition of an associated circuit breaker; and
   wherein the combination of a selected illumination characteristic and a selected shaped translucent portion provides a fault identification.

5. The faceplate assembly of claim 4 wherein:
   the condition of an associated circuit breaker includes conditions selected from a group including arc fault, ground fault, degrading CVD thermal, ACFI, GF, and diagnostic; and
   wherein each said fault identification is associated with one circuit breaker condition.

6. The faceplate assembly claim 4 wherein said fault identification is a sole warning indicia of a fault associated with a selected circuit breaker.

7. The faceplate assembly of claim 1 wherein an illumination of said source of localized illumination is a sole warning indicia of a fault associated with a selected circuit breaker.

8. The faceplate assembly of claim 1 wherein said circuit breaker module includes an electrical module configured to communicate with said faceplate and an electrical connector receptacle in electrical communication with said electrical module and wherein said faceplate includes a plug-in electrical connector, said plug-in electrical connector configured to correspond to said electrical connector receptacle.

9. The faceplate assembly of claim 1 wherein said source of localized illumination also includes an LED strand having a plurality of LEDs.

10. A circuit breaker panel electrical module comprising:
    a frame assembly, a number of circuit breakers, and a faceplate assembly;
    said frame assembly having a front member and a back member, said frame assembly front member and said frame assembly back member being spaced from each other and defining an enclosed space;
    each said circuit breaker having a body with an outwardly extending movable handle;
    said faceplate assembly including a faceplate and a number of sources for localized illumination;
    said faceplate including a planar member with a first side and a second side, wherein the planar member is a compressive member and said planar member first side has a number of opaque portions and a number of translucent portions, said planar member defining a number of openings that are sized to receive the respective movable handles of the circuit breakers so as to prevent a passage of light through the openings while permitting the light to pass through the translucent portions of the planar member first side, each planar member first side translucent portion disposed adjacent a planar member opening;
    each said source of localized illumination is disposed adjacent said planar member second side and adjacent a planar member first side translucent portion;
    said faceplate assembly coupled to said frame assembly front member;
    each said circuit breaker body disposed in said circuit breaker panel electrical module frame assembly enclosed space with each circuit breaker outwardly extending movable handle extending through a faceplate planar member opening;

wherein each said source of localized illumination may be illuminated causing one said planar member first side translucent portion to be illuminated, wherein said source of localized illumination is an electroluminescent backlight that is a panel member applied to the planar member;

said faceplate assembly further including a number of fasteners and a number of faceplate assembly couplings, the faceplate assembly couplings being sized and positioned to correspond to the faceplate assembly fasteners; and the faceplate planar member being spaced from the frame assembly back member such that when said faceplate assembly fasteners are connected to said frame assembly faceplate assembly couplings, said faceplate planar member compresses said circuit breakers in said frame assembly so as to bias the circuit breakers toward the frame assembly back member.

11. The circuit breaker panel electrical module of claim 10 wherein:

said source of localized illumination has changeable characteristics, said changeable characteristics selected from a group including color, strobe, and intensity;

selected said planar member first side translucent portions are associated with an adjacent planar member opening;

said planar member first side translucent portions include shaped translucent portions selected from a group including a halo and a highlight, said source of localized illumination structured to change characteristics in response to a condition of an associated circuit breaker;

wherein the combination of a selected illumination characteristic and a selected shaped translucent portion provides a fault identification; and the condition of an associated circuit breaker includes conditions selected from a group including arc fault, ground fault, degrading CVD thermal, ACFI, GF, and diagnostic; and wherein each said fault identification is associated with one circuit breaker condition.

12. The circuit breaker panel electrical module of claim 11 wherein said fault identification is a sole warning indicia of a fault associated with a selected circuit breaker.

13. The circuit breaker panel electrical module of claim 10 wherein said circuit breaker panel electrical module includes an electrical module configured to communicate with said faceplate and an electrical connector receptacle in electrical communication with said electrical module and wherein said faceplate includes a plug-in electrical connector said plug-in electrical connector configured to be correspond to said electrical connector receptacle.

14. The circuit breaker panel electrical module of claim 10 wherein said source of localized illumination also includes an LED strand having a plurality of LEDs.

* * * * *

UNITED STATES PATENT AND TRADEMARK OFFICE
CERTIFICATE OF CORRECTION

PATENT NO. : 9,520,257 B2
APPLICATION NO. : 14/125153
DATED : December 13, 2016
INVENTOR(S) : Mills et al.

Page 1 of 1

It is certified that error appears in the above-identified patent and that said Letters Patent is hereby corrected as shown below:

On the Title Page

Under (*) Notice please delete "This patent is subject to a terminal disclaimer"

Signed and Sealed this
Twentieth Day of February, 2018

Andrei Iancu
*Director of the United States Patent and Trademark Office*